Figure 1:
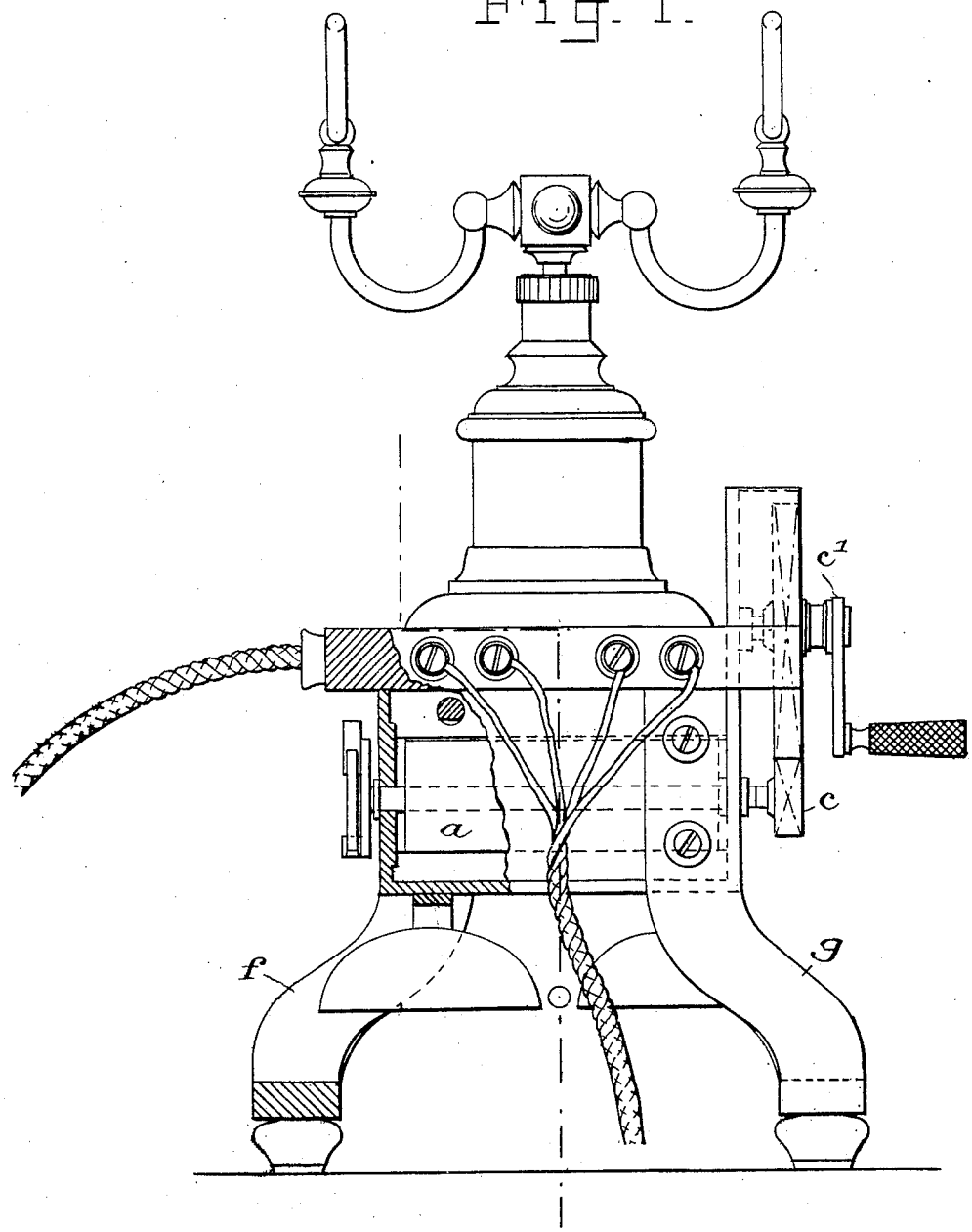

(No Model.)　　　　　　　　　　　　　　　2 Sheets—Sheet 1.
L. M. ERICSSON.
TABLE TELEPHONE APPARATUS.

No. 578,006.　　　　　　　　　　　Patented Mar. 2, 1897.

WITNESSES:
E. B. Bolton
E. A. Scott

INVENTOR
Lars Magnus Ericsson
BY Richards
ATTORNEYS

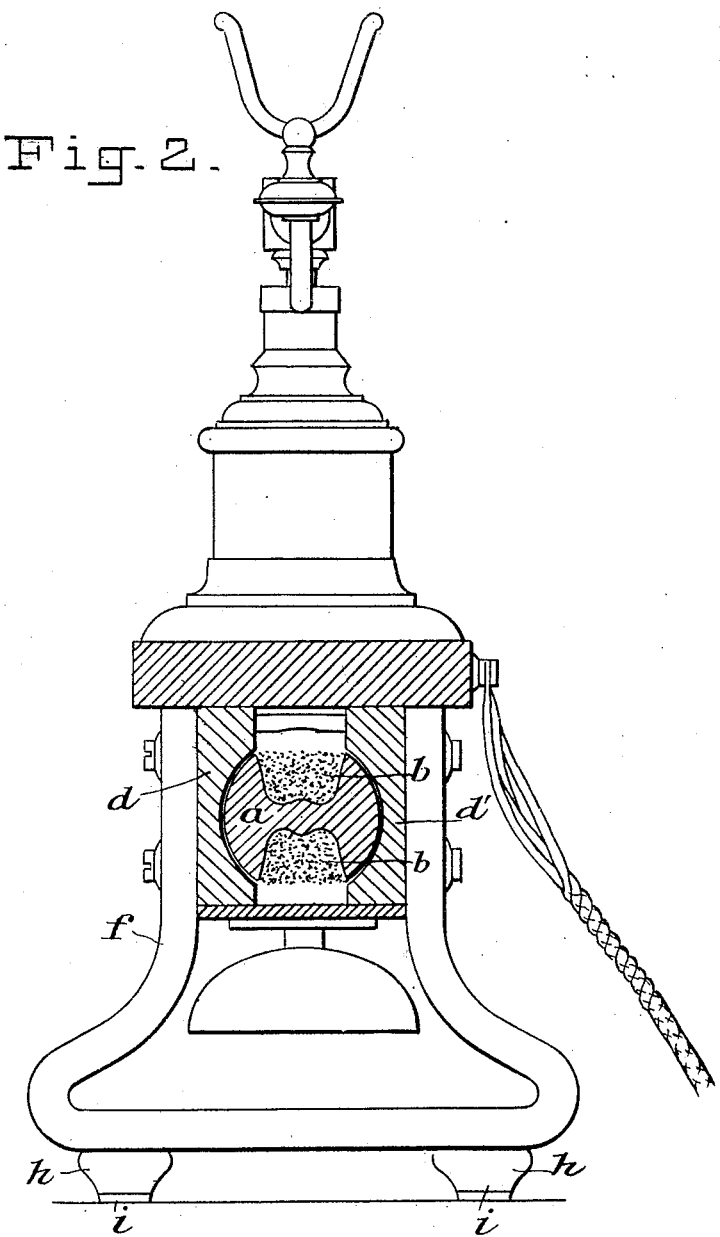

United States Patent Office.

LARS MAGNUS ERICSSON, OF STOCKHOLM, SWEDEN.

TABLE-TELEPHONE APPARATUS.

SPECIFICATION forming part of Letters Patent No. 578,006, dated March 2, 1897.

Application filed October 27, 1896. Serial No. 610,214. (No model.)

*To all whom it may concern:*

Be it known that I, LARS MAGNUS ERICSSON, manufacturer, a subject of the King of Sweden and Norway, and a resident of Stockholm, in the Kingdom of Sweden, have invented certain new and useful Improvements in the Electromagnets of Table-Telephones, of which the following is a specification, reference being had therein to the accompanying drawings.

This invention relates to telephones intended to stand on a table, a writing-desk, or the like, and particularly to an arrangement of the magnets belonging to the induction apparatus, by means of which the bells are actuated.

The invention consists therein that the said magnets are arranged in such a manner that they also serve as legs of the telephone apparatus if this is placed on a table or the like. The magnets, having the shape of a horseshoe, are therefore placed vertically, turning the closed end, which preferably is somewhat widened, downward. The construction of the apparatus is thereby highly simplified at the same time as the appearance of the apparatus becomes nice.

Figure 1 shows a side view of a telephone arranged according to this invention, and Fig. 2 shows an end view of the same.

The inductor consists, as usual, of an iron core $a$, which is uncovered on two opposite sides, but covered on the other two sides by the coil $b$, running parallel with the axis of the core. The core $a$, which may be put in rotary motion by means of the gearing $c$ and the crank $c'$, rotates between the two sleeve-halves $d\ d'$, to which the two magnets $f$ and $g$ are secured. The magnets have the shape of a horseshoe and are placed parallel with each other, but perpendicular to the axis of the inductor, and their one pole ends are fixed to the one and their other pole ends to the other of the two sleeve-halves $d\ d'$, situated at some distance from each other. The magnets are rather high and widened downward and bent outward from each other, thus forming steady legs of the apparatus. Besides this, buttons $h$ are fixed under the magnets and provided with india-rubber shoes $i$ or the like in order that the magnets may not come in contact with the object on which the apparatus is placed.

Having now described my invention, what I claim as new, and desire to secure by Letters Patent, is—

1. In a telephone apparatus the combination of the rotary core, the pole-pieces and the horseshoe magnets attached thereto at each end, said magnets extending downwardly from the core and having broadened and spreading base portions to serve as supporting-feet, substantially as described.

2. In a telephone apparatus the combination of the rotary core, the pole-pieces and the magnets of horseshoe shape extending downwardly from opposite ends of the pole-pieces to form the supporting-feet, substantially as described.

In witness whereof I have hereunto signed my name in the presence of two subscribing witnesses.

LARS MAGNUS ERICSSON.

Witnesses:
   A. S. BÜSING,
   A. A. KARGL.